United States Patent [19]

Stella

[11] 4,370,035
[45] * Jan. 25, 1983

[54] DUAL WEB SOUND MOVIE CASSETTE WITH EMULSION STRIPPING WEB

[75] Inventor: Joseph A. Stella, Peabody, Mass.

[73] Assignee: Polaroid Corporation, Cambridge, Mass.

[*] Notice: The portion of the term of this patent subsequent to Oct. 9, 1996, has been disclaimed.

[21] Appl. No.: 278,908

[22] PCT Filed: Sep. 24, 1979

[86] PCT No.: PCT/US79/00761

§ 371 Date: May 21, 1980

§ 102(e) Date: May 21, 1980

[87] PCT Pub. No.: WO80/00752

PCT Pub. Date: Apr. 17, 1980

Related U.S. Application Data

[63] Continuation-in-part of Ser. No. 947,769, Oct. 2, 1978, Pat. No. 4,170,407.

[51] Int. Cl.³ .............................................. G03B 23/02
[52] U.S. Cl. .................................. 352/78 R; 352/130; 351/27
[58] Field of Search ................. 352/27, 72, 78 R, 129, 352/29, 130; 242/71.2, 199

[56] References Cited

U.S. PATENT DOCUMENTS

| | | |
|---|---|---|
| 1,957,525 | 5/1934 | Brown et al. . |
| 1,963,179 | 6/1934 | Stacey . |
| 2,962,927 | 12/1960 | Warren . |
| 3,240,329 | 3/1966 | Custin . |
| 3,455,633 | 7/1969 | Land . |
| 3,600,071 | 8/1971 | Downey . |
| 3,604,790 | 9/1971 | Land et al. . |
| 3,615,127 | 10/1971 | Land . |
| 3,674,345 | 7/1972 | Chernotsky et al. . |
| 3,709,588 | 1/1973 | Land . |
| 3,711,192 | 1/1973 | Land . |
| 3,856,387 | 12/1974 | Wray et al. . |
| 3,895,862 | 7/1975 | Stella et al. . |

Primary Examiner—Monroe H. Hayes
Attorney, Agent, or Firm—David R. Thornton

[57] ABSTRACT

A multipurpose audio/visual film cassette (10) including supply and takeup spools (26, 28) in which opposite ends of a film strip (30) are coupled for alternate winding and unwinding during passage through a first path for film exposing, processing and projecting operations with an audio tape (54) also coupled at least on one end with the supply spool (26) and interwound with the film strip (30) to pass through a separate path, and a stripping and separating web (80) is coupled at least on one end to the supply spool (26) and preferably extending directly to the takeup spool (28) in a third path with the web (80) being arranged to overlie the side of the film strip (30) on which processing fluid is deposited and wound in convolutions between such side and the audio tape (54) to prevent adherence of the audio tape (54) to the film strip (30) and to strip a negative emulsion layer from the film strip (30) after processing.

4 Claims, 6 Drawing Figures

DUAL WEB SOUND MOVIE CASSETTE WITH EMULSION STRIPPING WEB

This is a continuation-in-part of U.S. application Ser. No. 947,769, filed Oct. 2, 1978, now issued as U.S. Pat. No. 4,170,407.

BACKGROUND OF THE INVENTION

This invention relates to audio/visual systems and, more particularly, to an improved multipurpose, film handling cassette for sound motion picture systems.

Motion picture systems including a multipurpose film cassette in which a film strip is contained without removal during exposure, processing and projection operations are described in prior U.S. Pat. Nos. 3,615,127, 3,600,071, and 3,895,862. In accordance with the disclosures of these patents, the film cassette is first placed in a camera for exposure of the film strip therein in conventional fashion. After exposure, the cassette is loaded into a viewing device which first subjects the cassette to a sequence of operations during which the film strip is processed to develop a series of image transparency frames. The same viewing device then projects the developed image frames onto a screen for motion picture viewing.

The cassette system represented by the disclosure of these prior patents may be provided with an audio capability as disclosed in prior U.S. Pat. Nos. 3,604,790 and 3,856,387. In the audio/visual systems disclosed in these latter patents, a magnetic sound recording track is provided along one or both of the longitudinal borders of the cassette contained film strip and the cassette includes a provision for moving a loop of the film strip in operative relationship with a transducing head forming part of an audio system. While the arrangements disclosed in these patents provide generally acceptable audio reproduction, the narrow width of the audio tracks necessitated by their being carried directly on the film strip limits the level of sound quality which may be achieved or, conversely, increases the degree of sophistication or cost required of the audio system to achieve high fidelity.

The sound track dimensional limitations of the prior systems may be solved by providing in the cassette a separate audio tape in addition to the usual photographic film strip. Both the tape and the strip may extend between, and may be interwound in nesting convolutions on, cassette contained supply and takeup spools. In this way, both the tape and the film strip may be simultaneously wound or unwound from the respective spools but the path through which the sound tape passes between the spools is different from that of the film strip. In particular, the film strip travels through a path including an exposure/projection station whereas the sound tape travels in a path including an audio transducing head and drive capstan.

The principal difficulty encountered with such dual web systems in the multipurpose cassettes having a provision for processing the motion picture film strip is the tendency for the sound tape to adhere to the emulsion or, at least, to processing fluid on the film strip emulsion during the period just following the deposition of processing fluid on the film strip. This problem may be overcome by providing a mechanical stripping device for separating the sound tape from the film strip. Relative movement of the mechanical stripping device and the film strip, however, is likely to produce an undesirable wearing and possibly damage to one or both webs, particularly after repeated projection cycles.

The film strip currently used in the system is an additive color film structure including, in the order of light transmission during exposure, a transparent polyester carrier base, an additive color screen, a processing fluid barrier layer, a positive image receiving layer or interface, a silver halide emulsion or negative image receiving layer, and an inner layer of antihalation dyes and image stabilizer. When processed by coating the inner layer with a thin uniform layer of processing fluid or liquid, the chemicals contained in the processing fluid permeate the inner layer to the emulsion to develop exposed silver halide grains and render them essentially transparent. Unexposed silver halide grains migrate by diffusion to the positive image-receiving interface at which they are transformed into an opaque silver image in varying degrees of density. During and after development of the images, the antihalation dyes in the inner layer are bleached to become colorless. The negative image in the emulsion is sufficiently low in covering power relative to the positive image that the film strip may be viewed by projection of light in a direction proceeding through the inner layer, the processed emulsion layer and the remaining positive image carrying portions of the film strip and the color screen.

The presence of the spent emulsion layers on the film strip after processing and during projection can be characterized as a compromise between advantages to be gained by removal of these layers and difficulties heretofore experienced in achieving their removal while retaining the desirable characteristics of the present system, particularly those characteristics attributed to the retention at all times of the film strip in the same cassette in which it was initially packaged. A principal advantage to be gained by removing the spent inner emulsion layers is greater transmissibility of the processed film during projection. The problems resulting from retention of the spent inner and emulsion layers on the processed film strip have been recognized previously and dealt with by stripping these layers from the film after processing. See, for example, U.S. Pat. Nos. 3,455,633; 3,709,588, and 3,711,192.

SUMMARY OF THE INVENTION

In accordance with the present invention, the problems associated with dual web multipurpose film cassettes and with stripping or removing of negative emulsion layers are alleviated by providing a third, separating and stripping web extending between the cassette-contained supply and takeup spools with the sound tape and film strip. The separating web is interposed between the tape and the film emulsion surface, and passes between the spools under tension adequate to assure ready separation of the separating web and the negative emulsion from the film strip in a smooth and positive manner without interfering in any way with the operation of the cassette in any of its several modes of operation. The separating web is interposed between the emulsion side of the film strip and the sound tape so that when the three webs are wound in nesting or interleaved convolutions on either one or both of the supply and takeup spools, one side of the sound tape is in contact with the dry carrier side of the film strip whereas the other side of the sound tape is in contact with the separating web.

Among the objects of the present invention, are therefore, the provision of an improved multipurpose film cassette capable of use with audio/visual apparatus; the provision of such a film cassette in which a sound tape may be wound with a film strip immediately after the deposition of a processing liquid thereon without adherence of the sound strip to the film strip; the provision of an improved web stripping arrangement for removing negative emulsion in dual web photographic film cassettes; and the provision of such an improved arrangement which is low in cost, easy to adapt to existing cassette designs, and trouble-free in operation.

Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
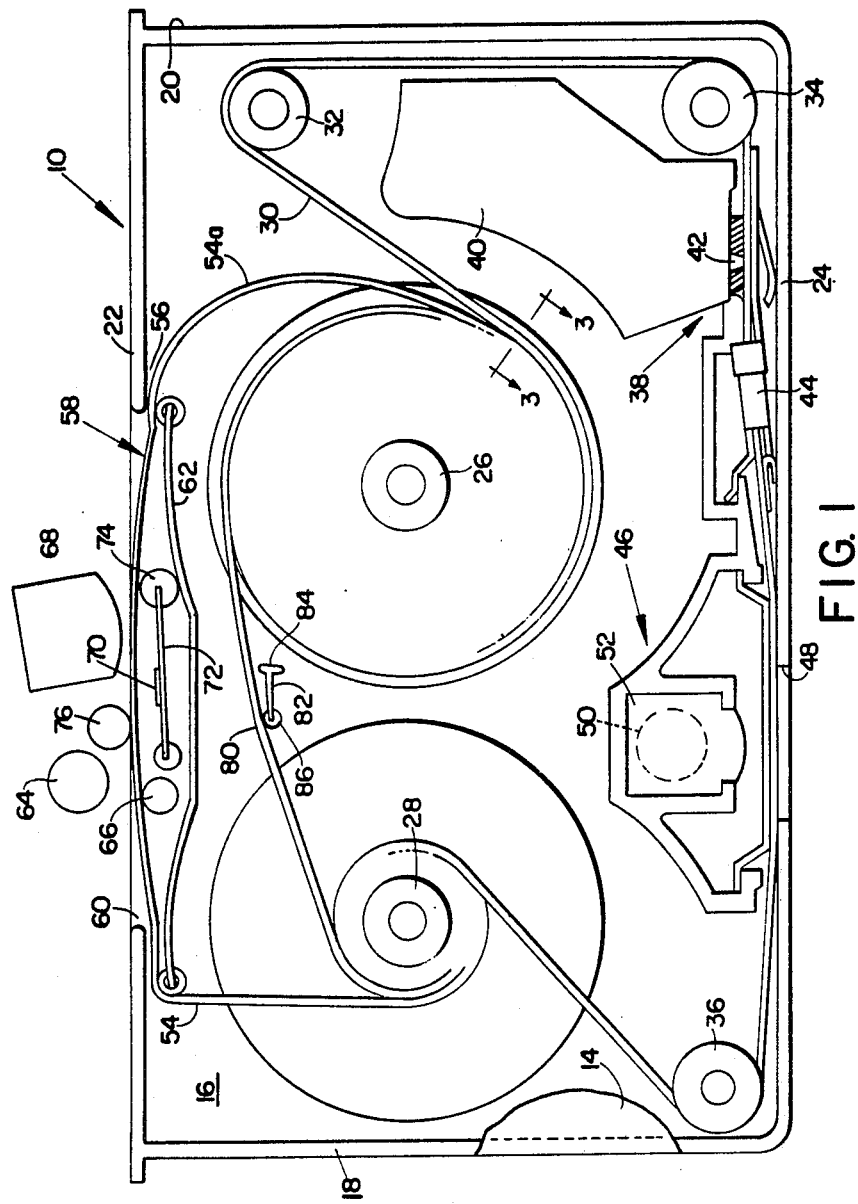
FIG. 1 is a cutaway side elevation illustrating the interior components of a multipurpose film cassette incorporating a separating and stripping web in accordance with the present invention.

In FIG. 1 of the drawings, an embodiment of the present invention is shown in a multipurpose film cassette of a type similar to those described in the aforementioned patents. As such, the cassette includes an exterior housing 10 defined by planar side walls 14 and 16 joined by end walls 18 and 20 and by elongated top and bottom walls 22 and 24, respectively. Rotatably supported on parallel axes between the side walls 14 and 16 are supply and takeup spools 26 and 28, respectively, to which opposite ends of a photographic film strip 30 are attached. The path of the film strip 30 between the supply and takeup spools extends from the supply spool 26 about a bobulator roller 32, an idler roller 34, through a flight along the interior of the bottom wall 24, about a snubbing roller 36 and finally to the takeup spool 28.

In its flight between the idler roller 34 and the snubbing roller 36, the film strip 30 passes through a photographic station including a processing station 38 which includes a reservoir 40 for containing a supply of processing fluid such as an aqueous processing liquid adapted to be applied to the emulsion side of the film strip 30 through a nozzle 42. Also shown in FIG. 1 is a valve assembly 44 movable by the film strip 30 during the terminal portions of a processing cycle to a position closing the nozzle 42.

After passing the processing station 38 during travel through the photographic station in a direction proceeding from the supply spool 26 to the takeup spool 28, the film strip 30 passes an exposure/projection station 46, which includes an opening 48 in the bottom wall 24 through which light may pass both during exposure of the film strip in a motion picture camera (not shown) and during projection in a viewing device (not shown). In this latter respect, the station 46 includes an opening 50 through which light from a projector is passed to a reflecting prism 52 through the film strip and the opening 48.

Inasmuch as the operation of the cassette during exposure, processing and projection of the film strip 30 is fully described in one or more of the aforementioned patents, these operations will be only cursorily summarized herein. In particular, when the cassette is loaded in an appropriate camera, the film strip travels through its path from the supply spool 26 to the takeup spool 28 for exposure of successive image frames at the station 46. When the film strip 30 is so exposed, it will be wound on the supply spool 28. The cassette is then removed from the camera and placed in the viewing device of the system which programs a processing cycle during which the film strip 30 is rewound from the takeup spool 28 to the supply spool 26. During the initial portion of such rewinding, the processing station 38 is activated and the emulsion side of the film strip will be coated with a layer of processing fluid as the strip is rewound on the supply spool 26. Thereafter, the direction of film strip travel is reversed for projection of the developed images thereon.

Figure 3:
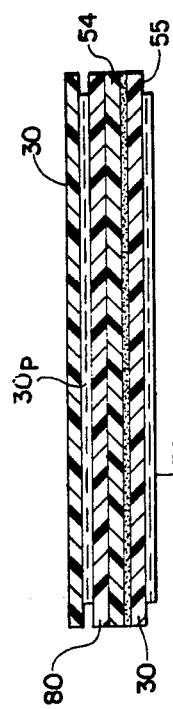
FIG. 3 is an enlarged cross section on line 3—3 of FIG. 2.

To provide for an audio capability, the illustrated multipurpose cassette is provided with a separate audio tape 54 having an oxide coating 55 (shown in FIG. 3). The tape 54 is a flexible web of the same width as the film strip 30 and is interwound with the film strip 30, in the disclosed embodiment, on both the supply and takeup spools 26 and 28. In this respect, opposite ends of both the film strip 30 and the audio tape 54 are secured in overlying relationship to both the supply and takeup spools in the cassette illustrated. While both webs are coupled to the spool, only one of the webs (i.e., the film strip) need be directly connected to the spool while the other web (i.e., the tape) may be connected to the first at a point close to the latter's spool connection.

In FIG. 1 of the drawings, both the strip 30 and the tape 54 are illustrated in their relative conditions in an unused or rewound cassette in which both webs are on the supply spool 26. The path through which the audio tape 54, however, extends from the supply spool to the takeup spool 28 diverges from that taken by the film strip 30. In particular, the audio tape proceeds from the supply spool upwardly through a tape exit opening 56, past an audio station 58 defined in part by an opening in the top wall 22 of the cassette housing 10, to a cassette entry opening 60 where it re-enters the cassette and passes to its point of attachment with the takeup spool 28. The exit 56 and the entry 60 are established in part by a light shielding baffle 62 having low friction guiding surfaces 61 and 63 at opposite ends and spanning the opening 58 in the top wall 22 of the cassette.

The path of the audio tape 54 may alternately extend from the supply spool, past an audio station to a second takeup spool (not shown) separate from the film takeup spool 28. In such a cassette, only one end of the audio tape is connected to the supply spool, but the same interwinding of the audio tape and the film strip will occur during processing and/or rewinding of the film strip from the takeup spool 28 back to the supply spool 26.

Figure 2:
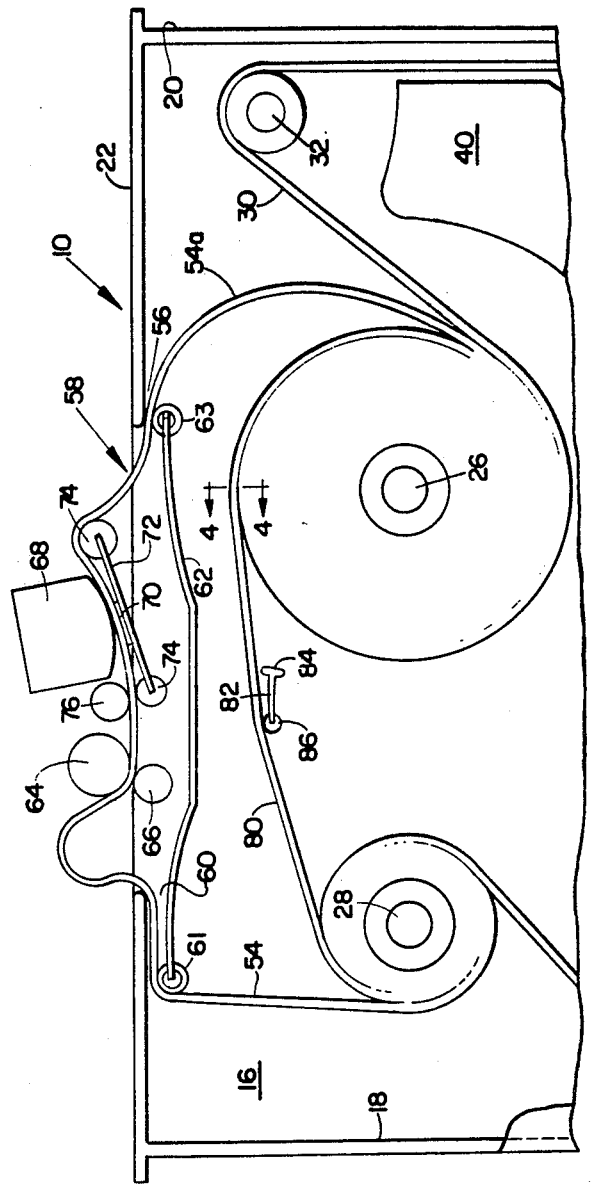
FIG. 2 is a fragmentary side elevation similar to FIG. 1 but with the components in a different condition of operation.

Suitable audio components carried by either or both the photographic camera and the viewing device with which the cassette is to be used are illustrated in respective inactive and operative conditions in FIGS. 1 and 2 of the drawings. As schematically shown in these figures, the audio components include a drive capstan 64 and a backup idler roller 66 which, when closed on one another, operate to advance the audio tape 54 at uniform speed past a transducing head 68. A head backup pad 70 supported by a member 72 extending between a pair of head backup rollers 74 retain the audio tape in operative engagement with the transducer head as illustrated in FIG. 2. An idler backup roller 76 engages one of the backup pad carrying rollers when the system is operative as illustrated in FIG. 2. In its initial condition as shown in FIG. 1, the audio tape 54 extends through loop portion 54*a* which is sufficiently stiff, at least over the initial portion thereof, to assume the bowed configuration in the opening 58 of the cassette housing so as to permit convenient insertion of appropriate audio components under the tape web 54. The loop 54*a*, as may be seen in FIG. 2, allows the audio tape 54 to be passed continuously at a constant speed past the transducer head 68 in operation irrespective of whether it is paid out from the supply spool at a constant speed.

It has been recognized that the interwinding of the sound tape 54 with the film strip 30, particularly on the supply spool as an incident to film strip processing, gives rise to the problem of the sound tape sticking to the wet side of the film or, wet processing fluid applied to the film strip immediately in advance of its being rewound onto the supply spool 26. In accordance with the present invention, this problem as well as stripping of the negative emulsion, is effectively solved by interwinding with the audio and film webs, a third or separating web 80.

The separating and stripping web 80 is a flexible strip of, for example, plastic material such as Mylar, approximately equal in width to the film strip 30 and the tape web 54, and preferably inert and impervious to the processing fluid (designated as 30*p* in FIG. 3). Advantageously like the film and tape, the separator web 80 need only be coupled to the spool and may be connected to one or both of the other strips near their spool end, rather than directly connected to the spool itself.

In the embodiment shown in both FIGS. 1 and 2 of the drawings, the separating web 80 extends directly from the supply spool 26 to the takeup spool 28 and is preferably guided along a separate path and maintained under tension with respect to both spools by a leaf spring 82 or other equivalent means secured to the front or back wall 14 or 16 of the cassette housing interior between the supply and takeup spools 26 and 28. In the illustrated embodiment, the tensioning spring 82 is in the nature of a flexible leaf spring cantilevered from a mounting boss 84 and having an anti-friction guide 86 at its projecting end.

In FIG. 3, the respective webs are shown greatly enlarged. By comparing FIG. 3 and FIG. 1, it will be seen that as the three webs are rewound onto the supply spool 26 during processing of the film strip 30, the layer of processing fluid 30*p* (FIG. 3) will be presented in an outwardly facing direction as the strip 30 is initially wound on the supply spool 26. The separating web 80 will then overlie the film emulsion surface which becomes wetted with the processing fluid. At the same time, the audio tape 54 will be interwound on the supply spool with one surface engaging the separating web 80 and the other surface (i.e., its oxide coating 55) contacting the base or always dry surface of the film strip 30. In this way, the audio tape 54 is never brought into direct contact with the emulsion or the wet processing fluid layer 30*p*. It should be noted that the thickness of the processing layer 30*p* is exaggerated in FIGS. 3-6 for clarity; however, in practice the layer is initially less than 0.00127 mm and is to a large extent, quickly absorbed into the emulsion surface of the film.

In the operation of the cassette incorporating the separating web 80 of the present invention, both the film strip and the audio tape may pass from the supply spool to the takeup spool in the manner aforementioned. The separating web 80, being under a slight tension, will pass in an essentially tangential path from the supply spool and strip away the negative emulsion layers from the film strip.

Figure 4:
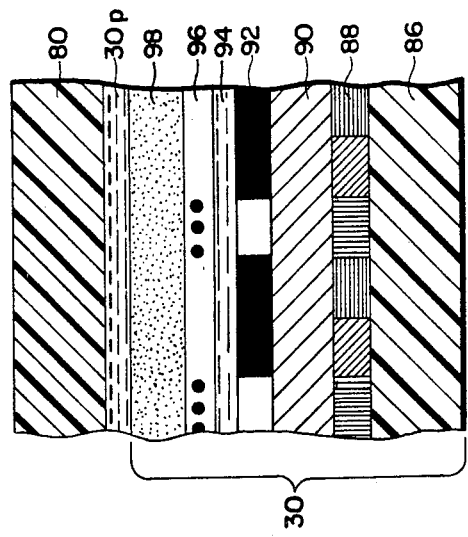
FIG. 4 is a greatly enlarged fragmentary cross-section of the film strip and separating web taken on line 2—2 of FIG. 1.

In FIG. 4, the details of various functioning layers of photographic material of the film strip is depicted after it has been rewound past the processing station 40, but with the scale of various layers being exaggerated with respect to those illustrated in FIG. 3. The film strip 30 is constituted by a base layer providing a transparent polyester carrier base 86 through which light is passed in the direction of the arrow 87 during film strip exposure. In the order of such exposure light transmission, the carrier base 86 is followed by a color screen layer 88 which in practice is constituted by a series of red, green, and blue lines. Superimposed successively on the color screen are a processing fluid barrier layer 90, a positive image receiving layer 92 depicted in FIG. 2 with a positive silver image, a release coat 94, a negative or light sensitive emulsion layer 96, depicted in FIG. 4 with a negative image of low covering power, and a cover layer 98 initially containing antihalation dyes and an image stabilizer. Principally to provide an understanding of the surface on which the processing fluid 30*p* is applied to the film strip 30, the processing fluid is also depicted as a layer although at this stage of the development, much of this layer has been imbibed into the film emulsion. Finally, the web 80 is illustrated in overlying relation to the inner layer 98 with the processing fluid interposed therebetween.

The release coat 94 may be an alkali-degradable wax or other coating, which is at least partially dissolved or degraded by the alkaline processing liquid 30*p* such that after processing, the release coat 94 reduces the adhesion between the positive image layer 92 and the negative image layer 96 so that such adhesion is less than the adhesion of the web 80 to the wetted emulsion, that is, to the cover layer 98. In this regard, the adhesion between the web 80 and the wet processed film is facilitated by the imbibition period during which the wet film and web are retained in a wound condition on the supply spool, just following the processing rewind, for a short time period of approximately 10 to 30 seconds to aid image development.

As mentioned previously, the development of the positive silver image in the layer 92 is as a result of the processing fluid diffusion through the cover layer 98 to the emulsion layer 96 where exposed grains of silver halide contained therein are developed and unexposed grains are dissolved and caused to migrate by diffusion transfer to the positive image receiving layer 92 where they are transformed into a variably opaque silver positive image. The layers 96 and 98, after processing, are essentially transparent but result in a measure of light attenuation when the film strip is projected by light passing in a direction in the reverse of the arrow 87.

Because of the manner in which the web 80 is interwound with the film 30, it will be observed by reference to FIGS. 1 and 2 of the drawings, that as the film strip 30 is wound (from left to right) on the supply spool 26 during rewind with its deposition of the processing fluid 30p thereon, the web 80 will travel also from the takeup spool 26 to the supply spool and overlie the cover layer 98 as well as the residual processing fluid 30p on the cover layer at this time.

Figure 5:
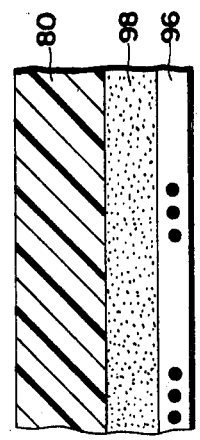
FIG. 5 is a cross-section of the separating and stripping web of FIG. 1, but showing film components carried by the stripping web after film processing and stripping.

Then, as the left-to-right direction of web travel is again reversed to right-to-left travel, such as during a mandatory projection cycle, the film strip 30 will pay off from the supply spool 26 through the film path to the takeup spool 28. The stripping web 80, however, in passing along its own path to the takeup spool 28, will diverge from or part from the film strip 30 and carry with it the spent inner layer 98 and emulsion layer 96 as shown in FIG. 5. This parting of such layers from the remaining layers of the film strip will result in part from the action of the release coat 94.

Figure 6:
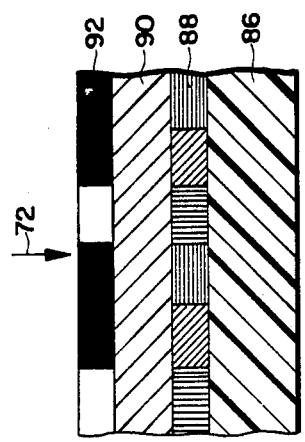
FIG. 6 is a cross-section of processed film after processing and stripping.

In FIGS. 5 and 6 of the drawings, the layers of photographic material separately carried by the stripping web 80 and the carrier base 86 of the film strip 30 are illustrated. Thus, in FIG. 5, the layers of material disposed inwardly of the release coat 94, specifically the spent emulsion layer 96 as well as the used cover layer 98, are attached by adhesion to the stripping web 80. Likewise as shown in FIG. 6, layers necessary to the viewing of a positive color image, such as the color screen 88 and the positive image receiving layer 92 remain with the carrier base 86 of the film strip. The separation of the layers 96 and 98 from the film strip 30 occurs naturally as a result of the tacky characteristics of the inner surface of the film, at least after the processing fluid 30p has been deposited on the film strip. This separation is, of course, augmented by the provision in the film strip of the release coat 94 between the image layers 92 and 96.

As a result of the separation or stripping of the layers 96 and 98 from the film strip 30, the latter only retains the base 86, the screen 88, the fluid barrier 90, and the positive layer 92, as noted in FIG. 6. Consequently, during the projection cycle following the processing operation, projection light passing in the direction of the arrow 82 will now pass only through the components of the film strip which are necessary to recreate the developed positive image formed in the layer 92. As a result, attenuation of light by the spent cover and emulsion layers is avoided. During the first projection cycle, as the web 80 is rewound with the film strip 30 on the takeup spool, any tendency for the layers 96 and 98 carried by this web to readhere to the film strip is reduced by virtue of the continued drying of the components. During subsequent rewind and projection cycles, the web 80 will merely be wound and rewound with the now developed film strip and the sound tape 54 without interference with projection and rewind operations.

As a result of this invention, a highly effective and readily adapted stripping apparatus is provided by which the aforementioned objectives are completely fulfilled. It is contemplated that modifications and/or changes may be made in the embodiment illustrated and described herein without departure from the substance of the present invention. It is expressly intended, therefore, that the foregoing description is illustrative of a preferred embodiment only, not limiting, and that the true spirit and scope of the present invention be determined by reference to the appended claims.

I claim:

1. In a photographic film cassette (10) having a film strip (30) coupled at opposite ends to cassette-contained supply and takeup spools (26, 28) upon which the film strip (30) may be alternately wound and unwound for movement between the spools in a first path through a photographic station, the film strip (30) including an emulsion surface, the cassette (10) including a processing station (38) operative after film exposure to deposit a thin layer (30p) of processing fluid on the emulsion surface of the film strip, the film strip having a carrier base (86) to support a plurality of layers including a light sensitive emulsion acted upon by the processing fluid and positive image forming layers located between the carrier base and the light sensitive emulsion, the cassette (10) further including an audio tape (54) coupled at one end to at least one of said spools (26, 28) for interwinding thereon with the film strip (30) and extending along a second path through an audio station, the improvement comprising:

a stripping and separating web (80) of thin flexible material having one end coupled to said one spool for interwinding thereon with the film strip (30) and the audio tape (54) in an interleaved manner interposed between the audio tape (54) and said emulsion surface of said one side of the film strip (30), the stripping and separating web (80) being movable from the one spool in a third path separate from the first and second paths so that during rewinding and processing of the film strip (30) in convolutions on the supply spool (26), said stripping web (80) overlies the inner layers of the film strip (30) now wetted with processing fluid and upon subsequent unwinding of both the film strip (30) and said stripping web (80) and corresponding travel in their separate paths, diverging separation of said stripping web (80) from the film strip (30) causes at least a portion of the light sensitive emulsion to be retained by adhesion on said stripping web (80).

2. The cassette of claim 1 wherein the end of said stripping and separating web (80) opposite from said one end is coupled to the other of said spools.

3. The cassette of either of claims 1 or 2 including means for tensioning said separating web (80) with respect to at least said one spool to facilitate separation of said stripping and separating web (80) from said film strip (30) during unwinding thereof.

4. The cassette of claim 1 wherein said one spool is said supply spool (26) and said cassette (10) further includes means for tensioning said stripping and separating web (80) with respect to said supply spool (26), and wherein the other end of said stripping and separating web (80) is coupled to the takeup spool (28) and said tensioning means includes yieldable guide means positioned between the supply and takeup spools (26, 28) to tension said separating web (80) with respect thereto.

* * * * *